Figures 1, 2:
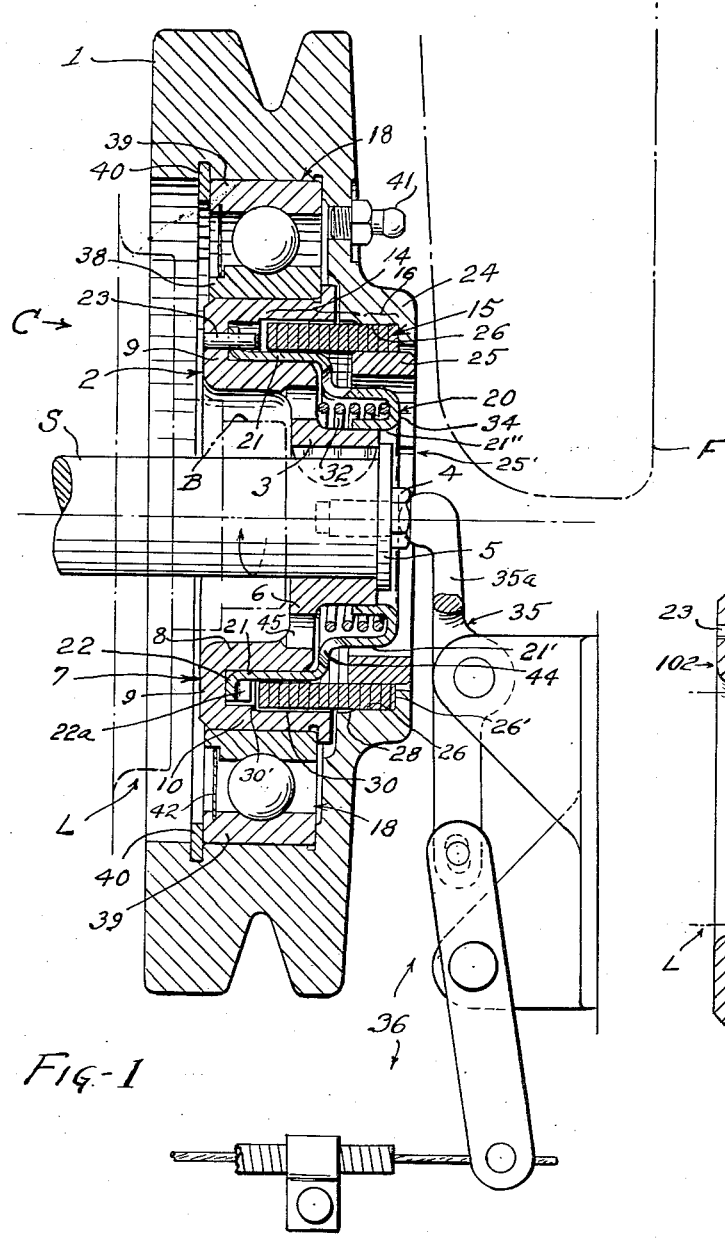

June 17, 1958

C. R. SACCHINI ET AL 2,839,169

SPRING CLUTCH MECHANISMS

Filed May 5, 1954

INVENTORS.
COLUMBUS R. SACCHINI
DONALD R. TOMKO

By George M. Soule
ATTORNEY

United States Patent Office 2,839,169
Patented June 17, 1958

2,839,169

SPRING CLUTCH MECHANISMS

Columbus R. Sacchini, Willoughby, and Donald R. Tomko, Cleveland, Ohio, assignors, by mesne assignments, to Curtiss-Wright Corporation, Marquette Metal Products Division, Cleveland, Ohio, a corporation of Delaware Application May 5, 1954, Serial No. 427,742

7 Claims. (Cl. 192—37)

The invention relates to a helical coil spring friction clutch mechanism of the type requiring actuation to and from a normally idle condition and a locked or engaged, torque transmitting, condition. The objects include provision of such a clutch mechanism having relatively high torque capacity, long useful, trouble-free life, substantial freedom from friction losses or drag under all conditions, and capability of being economically and accurately manufactured and assembled in quantity. The herewith illustrated design of clutch mechanism embodying the invention is especially adapted for driving a fluid compressor on an internal combustion engine driven vehicle, torque input to the clutch being received from a part of the engine which rotates continuously so long as the engine is running; and, in addition to the requirement that the clutch mechanism be sustantially free from other than clutching friction, hence wear and harmful heating of the parts, the mechanism must occupy a relatively small space in the direction of its rotational axis and, incidentally, provide an element necessary for the cooling of the compressor. Objects of the invention not indicated above will be brought out in the following description of the preferred and illustrated forms.

In the drawing, Fig. 1 shows, in full scale, the clutch assembly, mainly in longitudinal central section, the preferred clutch actuator linkage and associated parts of the engine and compressor being shown in side elevation or diagrammatically; and Fig. 2 is a fragmentary detail sectional view, similar to Fig. 1, illustrating a modified construction.

Referring to Fig. 1, the compressor, a small part of which is indicated by broken lines L, has an input shaft S on the free end of which the present subject clutch mechanism C is mounted in the relatively small axial space between the compressor and the usual engine fan F partially shown or indicated by broken lines. The main input member of the clutch is a pulley 1 adapted to be driven by the engine fan belt, not shown. A shaft seal portion B of compressor L has to be accommodated partly within the present clutch mechanism C. The pulley 1 embodies considerable mass and has a fairly large diameter, and the permitted axial length of the clutch assembly C as a whole is relatively small. The amount of torque to be transmitted and various considerations of design necessitates choice of a clutch spring length which is unusually small relative to the clutch spring diameter. Spring clutches, as usually made, and which require certainity of actuation and deactuation, as by remote control, are not accommodated by the envelope proportions required in the illustrated installation.

A one-piece or integral shaft adapter 2 (driven or output element of clutch C) has a generally circular hub portion 3 which is suitably keyed to shaft S and is further secured thereto by a cap screw 4 in the end of the shaft and seated against a washer 5 axially overlying part of hub portion 3 in abutment therewith. Radially outwardly from hub 3 the shaft adapter 2, further considered in terms applicable to a wheel, has a narrow disc portion 6 and, thereabout, a rim portion constituted by an annular channel 7 having radially spaced apart coplanar concentric flanges 8 and 10 and a connecting web 9. The channel 7 is axially open in a direction away from the compressor L to provide part of a receiving annular pocket for normally free coils 14 of clutch spring 15 and part of an actuator member (hereinafter usually actuator sleeve) 20 for rendering the clutch spring operative and inoperative. The clutch spring 15 is fastened securely to the pulley 1 at anchoring coils 16 of the spring, so that the spring is forced to turn with the pulley 1 continuously during operation of the engine.

The actuator sleeve 20 is a generally cup shaped sheet metal part, having a cylindrical rim portion 21, outwardly flanged at 22 in axial alignment with the clutch spring, and having a reduced diameter or neck portion 21' lying inwardly, radially, a considerable distance from the spring but in alignment with the anchoring coils 16. The neck portion 21' of sleeve 20, as shown, has an inturned flange 21'', and both that flange and the rim portion 21 have easy sliding fit over corresponding outer peripheral surface portions of the shaft adapter 2. Thereby, the actuator sleeve 20 is adequately supported and guided for free axial movement near its right hand end portion, at which portion force is most advantageously applied to the sleeve 20 to cause its movement in opposite directions, and, additionally, the sleeve 20 is similarly supported in the region of its left hand end where it acts upon the clutch spring 15 to energize and to enable deenergizment of the spring. A pin 23 in shaft adapter portion 9 slidably enters a hole in flange 22 of the actuator sleeve 20 and constrains the actuator sleeve to turn with the shaft adapter 2 while allowing said sleeve to slide axially on the shaft adapter. The normally free coils 14 of clutch spring 15 are supported approximately concentrically with the main clutch axis (that of shaft S) by the cylindrical portion 21 of the actuator sleeve, which portion is slightly smaller in outside diameter than the normal inside diameter of the clutch spring. Actuation or energization of the clutch spring into clutching position (not shown) is accomplished by a lanced-out nib or tab 22a, bent (e. g.) at 90° from the principal plane of the flange 22. The tab is caused to interfere with the shoulder provided by the conventional end face (not shown) of the endmost free coil of the clutch spring. Actuation is accomplished by shifting of the actuator sleeve 20 to the right from its illustrated position under the influence of a compression coil spring 32 inside the actuator sleeve and acting thereon as will be evident.

The pulley 1, which is freely journalled on the shaft adapter 2 through the intermediary of a more or less conventional ball bearing assembly 18 (further described later), rigidly supports the inactive or anchoring coils 16 of the clutch spring which are held radially in tight contact with a cylindrical pocket surface 26 within a rugged central circular flange portion 24 of the pulley. The anchoring coils 16 are forced outwardly against surface 26 by a coil-anchoring, spring tempered, split steel ring 25 (split at 25' Fig. 1). Anchoring ring 25, which, in effect, is a radial expansion spring with a very high rate, is formed with its outer peripheral surface considerably larger in diameter than the inner peripheral surfaces of clutch spring coils 16, as formed and finished, which coils 16, in turn, are normally larger in external diameter than the cylindrical pocket surface 26 for interference fitting relationship thereto. The right hand end of the clutch spring 15 is end ground square so that the clutch spring tends to remain concentric with pocket surface 26 when the spring is forced into place against an annular shoulder 26' defining the effective end of the pocket. After manual assembly of the clutch spring 15 into the pulley 1 against shoulder 26', the anchoring ring 25 is pressed into the clutch spring (form left toward right) causing considerable contraction of the anchor ring diameter (permitted by split 25') whereby the coils 16 are permanently held very tightly in contact with internal cylindrical pocket surface 26. Thus no anchor "toe" has to be formed on the clutch spring and no pinning or the like of the spring into place has to be resorted to such as would greatly increase assembly expense and make disassembly difficult. It is very easy to replace clutch springs in the present clutch. When the pulley 1 and shaft adapter 2 are disconnected from each other (permitted by removal of bearing assembly from the pulley as is more or less evident from the drawing) the anchoring ring 25 can be forced out of place by movement of ring 25 to the right relative to the pulley, which operation cannot damage the clutch spring as by spreading open of any of its coils.

Incidentally, the use of the above described split ring 25 enables the selection of what amounts to a very large press fit "allowance" between the outer diameter of the ring 25 and the inner diameter of coils 16, such as would have proven impractical in case the ring 25 had been a continuous annulus. The reason is that variations within practicably usable tolerance dimensions (I. D. of pocket 26, O. D. and I. D. of clutch spring coils 16 and O. D. of such non-split ring 25) would sometimes result in insufficient tightness of the ring against the anchoring coils 16 and sometimes in too greater a degree of interference fit between such ring and the anchoring coils, or such a degree as would prevent insertion of the ring into the pocket-contained coils 16.

With the clutch spring 15 mounted as described above, and with the actuator sleeve 20 in the illustrated position, the clutch is idle (shaft S stationary while pulley 1 turns), and the free coils 14 of the spring may lightly overrun on the rim portion 21 of actuator sleeve 20, solely for support of the free coils with their outer peripheral clutching surfaces substantially concentric with but adequately spaced radially from coacting equal diameter and slightly spaced apart clutch drum surfaces 28 and 30 formed on the pulley 1 and the shaft adapter 2 respectively. The direction in which the clutch spring 15 is wound (right hand when operation is according to the arrow on shaft S), insures that the free spring coils 14 can only overrun (i. e. cannot grip) on the external diameter surface of the actuator sleeve 20 in case the normal radial clearance between the inner peripheral surfaces of the coils 14 is small enough to allow continuous contact between those coils, or some of them, and the actuator sleeve. The normal radial clearance between the spring coils 14 and the clutch drum surfaces 28 and 30 is, by design, much greater than the just previously mentioned clearance, so that the coils cannot under any circumstance (as by effects of drag, through the intermediary of grit, grease or other foreign matter) become self energizing into clutching position.

In order to minimize friction losses during both the idle time and working time of the clutch the compression spring 32 shown in Fig. 1 as a single coil spring between the reduced diameter neck portions 21' and 21'' of sleeve 20, causes actuation of the clutch spring through tab 22a as already indicated; and disconnection or unlocking of the clutch is effected by bifurcated lever 35 of control linkage mechanism 36 the arrangement and operation of which is self evident from the drawing. The two arms 35a (one shown) of the bifurcated lever 35 bear against the end wall 34 of actuator sleeve 20, thus directly opposing the action of spring 32 but only while the clutch is being disconnected and after rotation of the adapter ceases to take place following disconnection. Thereby at all times, i. e. during operating and idle or free running time, the clutch is substantially free from restraint by friction. That would not have been the case if the lever 35 had been arranged to move the actuator sleeve 20 in the direction to lock up the clutch, for then the lever 35, in the illustrated arrangement, would have to be maintained in rubbing contact with the rotating actuator sleeve wall 34 during operation of the clutch to transmit torque.

It will be apparent from Fig. 1 that if the actuator sleeve 20 is slid to the right from its illustrated position until its tab 22a interferes circumferentially with the extremity of the endmost coil 14 of the clutch spring 15, the now free coils 14 will be expanded radially outwardly into locking frictional contact with the clutch drum surfaces 28 and 30, causing the shaft adapter 2 and the rest to turn with the pulley 1 in the indicated direction as though positively connected therewith.

When the control mechanism 36 is operated to release the clutch (lever 35 turned to shift the actuator sleeve 20 to the left) the tab 22a, through friction contact with the end surface of the clutch spring, has a tendency to open the spring coils axially and prevent release of the clutch. To guard against such possibility an abrupt shoulder 30', at the left end of clutch drum surface 30, is provided, which shoulder is so positioned as to be capable of abutting the adjacent axial face of the end coil. The shoulder 30', in other words, prevents the free end coil of the clutch spring from following the actuator tab 22a into its illustrated position. Additionally the shoulder 30' prevents the clutch spring 15 from "creeping" out of place and becoming accidentally energized as by contact with the tab 22a or pin 23.

During assembly of the subject clutch the ball bearing unit 18 has its inner race member 38 pressed over the flange portion 10 of the shaft adapter 2, against a shoulder on said flange portion 10, and the outer race member 39 of the bearing assembly is retained in a complementary socket of the pulley 1 by a snap ring 40 of conventional form. Race member 39 has a free slip fit in its socket to enable the mechanism to be easily disassembled, for exposure of its principal parts (particularly the clutch spring 15, the actuator sleeve 20 and its operating spring 32), upon removal of snap ring 40. While the bearing assembly 18 can have a sealed-in supply of lubricant (adequate because the spring clutch elements do not require lubrication), the illustrated design includes a lubricant supply fitting 41 and the bearing is semi-shielded or sealed at one side only, see member 42.

Due to the facts that the clutch mechanism C is as large or is larger in diameter than the body or housing of the compressor L and the compressor can be expected to generate considerable heat in operation it is necessary to conduct cooling air from the fan F through the present clutch mechanism to the compressor. This is accomplished by providing sets of openings as at 44 and 45 in the adapter sleeve 20 and shaft adapter 2 respectively, and the openings are maintained in operative registration with each other by the pin 23 which prevents relative rotation of said sleeve and the shaft adapter.

In the modified construction according to Fig. 2, wherein some of the already described elements are given the same identifying characters as before, a plurality of actuator-sleeve-operating coil springs 132 are provided in the shaft adapter 102 which springs react against a shoulder or end wall portion 134 of the actuator sleeve 120 or at the region in which lever arms 35a bear on the actuator sleeve. The Fig. 2 illustrated construction somewhat simplifies formation of actuator sleeve and provides a free sliding support for reduced diameter portion 120' of the sleeve on a cylindrical surface portion of the shaft adapter near the regions of engagement of the lever arms 35a with the actuator sleeve. One of three equiangularly spaced springs 132 is intended to be suggested by Fig. 2, each supported in a respective axial socket in the shaft adapter 102. One set of air conducting openings in the actuator sleeve 120 and shaft adapter 102 is shown in Fig. 2 at 144, 145.

We claim:

1. A spring clutch mechanism comprising a driving rotary member adapted to be rotated continuously, a rotary driven member coaxial therewith, each of the members having an internal approximately cylindrical clutch drum surface, a helical generally cylindrical clutch spring bridging said surfaces and with free coils at one end portion normally out of clutching contact with said drum surfaces, means permanently connecting the opposite end portion of the spring to the driving member to cause the spring to turn therewith, an actuator sleeve slidable on the driven member, key constituting means preventing the actuator sleeve from turning relative to the driven member, the sleeve having a shoulder for energizing engagement with the clutch spring to expand its coils into clutching contact with said cylindrical drum surfaces, said sleeve having a cylindrical external surface portion in position radially to support the free coils of the clutch spring in centered relationship to the clutch drum surfaces but out of contact therewith, spring means acting continuously on the sleeve axially thereof in a direction to cause the shoulder of the sleeve to engage the clutch spring, and control means arranged to move the sleeve axially in a direction to oppose the spring means whereby to maintain the clutch mechanism in a non-torque-transmitting condition.

2. In a spring clutch mechanism, two relatively rotatable coaxial members having axially coadjacent peripheral clutch drum surfaces, a generally cylindrical helical clutch spring in bridging relationship to the drum surfaces for locking the members against relative rotation in one direction, one of the members having an approximately cylindrical anchoring surface axially adjacent the drum surface of that member and peripherally engaged by a plurality of coacting anchoring coils of the clutch spring, and a spring tempered one piece metallic split ring telescoping a plurality of said anchoring coils radially opposite the coil surfaces which peripherally engage said anchoring surface and in interference fitting relationship to the adjacent peripheral surfaces of the anchoring coils, so that the metal of the ring is permanently in radially strained condition.

3. The arrangement according to claim 2, wherein the said anchoring coils are in interference fitting relationship to said anchoring surface of said member to place the anchoring coils permanently under strain, and the split ring has a relatively greater degree of interference fitting relationship to the anchoring coils relative to the anchoring surface than the anchoring coils have.

4. The arrangement according to claim 2, wherein said one member has an axial shoulder at right angles to the rotational axis of the member and defining one end of the anchoring surface of that member and the endmost anchoring coil of the spring is complementarily formed generally flat, and the split ring operates to maintain the generally flat end surface of said endmost coil in tight abutment with said axial shoulder of the member.

5. In a spring clutch mechanism, a shaft arranged to be driven at times by a continuously rotating wheel coaxial therewith, a shaft adapter fixed to the shaft to turn therewith, the wheel being freely journalled on the shaft adapter, the adapter having a pocket of generally cylindrical form open axially toward a generally central portion of the wheel and providing an internal clutch drum surface and a concentric external cylindrical surface radially spaced therefrom and radially aligned therewith, a helical clutch spring anchored at one end to said portion of the wheel and having free coils adapted to engage the drum surface, an actuator sleeve slidable on said external cylindrical surface of the shaft adapter, means to prevent the sleeve from turning relative to the shaft adapter, the actuator sleeve having clutch-spring-energizing means arranged to engage and expand the clutch spring against said drum surface, the shaft adapter having a reduced diameter external cylindrical portion relative to the first mentioned cylindrical surface thereof and the actuator sleeve having a similarly reduced diameter portion slidably supported thereon and an axial end wall adjacent thereto, spring means axially supported by the shaft adapter and bearing on an inner surface of said end wall of the actuator sleeve to hold the sleeve in a clutch-spring-energizing position, and control means positioned to bear upon the opposite outer side of said end wall for holding the actuator sleeve in a clutch-spring-releasing position.

6. The clutch mechanism according to claim 5 wherein the actuator sleeve and the shaft adapter have mutually registering openings therethrough, so arranged that air can be impelled through the clutch mechanism in a direction generally parallel to the shaft.

7. In a spring clutch mechanism, a shaft arranged to be driven at times by a continuously rotating wheel coaxial therewith, a shaft adapter fixed to the shaft to turn therewith, the wheel being freely journalled on the shaft adapter, the adapter having a pocket of generally cylindrical form open toward a portion of the wheel and providing an internal clutch drum surface and a concentric external cylindrical surface radially spaced therefrom, a helical clutch spring anchored at one end to the wheel and having free coils adapted to engage the drum surface, a sheet metal actuator sleeve slidable on said external cylindrical surface of the shaft adapter, means to prevent the sleeve from turning relative to the shaft adapter, the actuator sleeve having clutch-spring-energizing means arranged to engage and expand the clutch spring against said drum surface, the shaft adapter having a reduced diameter external cylindrical portion relative to the first mentioned cylindrical surface thereof and the actuator sleeve having a similarly reduced diameter portion slidably supported thereon and an axial end wall portion adjacent thereto, a plurality of coil springs axially supported by the shaft adapter and bearing on an inner surface of said end wall portion of the actuator sleeve to hold the sleeve in a clutch-spring-energizing position, and control means positioned to bear upon the opposite outer side of said end wall portion for holding the actuator sleeve in a clutch-spring-releasing position.

References Cited in the file of this patent

UNITED STATES PATENTS

| 1,952,415 | Brownlee | Mar. 27, 1934 |
| 2,257,987 | Starkey | Oct. 7, 1941 |
| 2,516,269 | Starkey | July 25, 1950 |
| 2,638,791 | Rogers | May 19, 1953 |

FOREIGN PATENTS

| 8,343 | Great Britain | Apr. 2, 1914 |